(12) United States Patent
Appireddygari Venkataramana et al.

(10) Patent No.: US 11,119,823 B1
(45) Date of Patent: Sep. 14, 2021

(54) METHOD AND SYSTEM FOR JOB PRIORITIZATION IN BACKUP WINDOWS

(71) Applicant: EMC IP Holding Company LLC, Hopkinton, MA (US)

(72) Inventors: Mahesh Reddy Appireddygari Venkataramana, Bangalore (IN); Chetan Battal, Bangalore (IN); Swaroop Shankar D H, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/925,672

(22) Filed: Jul. 10, 2020

(30) Foreign Application Priority Data

May 27, 2020 (IN) .............................. 202041022246

(51) Int. Cl.
*G06F 9/46* (2006.01)
*G06F 9/48* (2006.01)

(52) U.S. Cl.
CPC ................................. *G06F 9/4887* (2013.01)

(58) Field of Classification Search
CPC ..................................................... G06F 9/4887
See application file for complete search history.

*Primary Examiner* — Gregory A Kessler
(74) *Attorney, Agent, or Firm* — Chamberlain, Hrdlicka, White, Williams & Aughtry (57) ABSTRACT

A method and system for performing jobs that includes obtaining a current status of a job scheduler queue, obtaining policy level information comprising one or more weightages for each job in the job scheduler queue, and obtaining a current number of available streams for processing jobs in the job scheduler queue. The method and system includes calculating a distance between a first job in the job scheduler queue and the remaining jobs in the job scheduler queue using the one or more weightages to obtain a plurality of distances. The remaining jobs are reordered in the job scheduler queue based on the calculated distances. After the reordering, the first job is scheduled in the job scheduler queue and, after the scheduling of the first job, removing the first job from the job scheduler queue.

20 Claims, 5 Drawing Sheets

METHOD AND SYSTEM FOR JOB PRIORITIZATION IN BACKUP WINDOWS

BACKGROUND

Computing devices may include any number of internal components such as processors, memory, and persistent storage. Each of the internal components of a computing device may be used to generate data. The process of generating, storing, and scheduling data may utilize computing resources of the computing devices such as processing and storage. The utilization of the aforementioned computing resources to generate backups may impact the overall performance of the computing resources.

SUMMARY

In general, in one aspect, the invention relates to a method for performing jobs that includes obtaining a current status of a job scheduler queue, obtaining policy level information comprising one or more weightages for each job in the job scheduler queue, and obtaining a current number of available streams for processing jobs in the job scheduler queue. The method includes calculating a distance between a first job in the job scheduler queue and the remaining jobs in the job scheduler queue using the one or more weightages to obtain a plurality of distances. The remaining jobs are reordered in the job scheduler queue based on the calculated distances. After the reordering, the first job is scheduled in the job scheduler queue and, after the scheduling of the first job, removing the first job from the job scheduler queue.

In general, in one aspect, the invention relates to a non-transitory computer readable medium that includes computer readable program code, which when executed by a computer processor enables the computer processor to perform a method for performing jobs that includes obtaining a current status of a job scheduler queue, obtaining policy level information comprising one or more weightages for each job in the job scheduler queue, and obtaining a current number of available streams for processing jobs in the job scheduler queue. The method includes calculating a distance between a first job in the job scheduler queue and the remaining jobs in the job scheduler queue using the one or more weightages to obtain a plurality of distances. The remaining jobs are reordered in the job scheduler queue based on the calculated distances. After the reordering, the first job is scheduled in the job scheduler queue and, after the scheduling of the first job, removing the first job from the job scheduler queue.

In general, in one aspect, the invention relates to a system that includes a processor and memory that includes instructions, which when executed by the processor perform a method for performing jobs that includes obtaining a current status of a job scheduler queue, obtaining policy level information comprising one or more weightages for each job in the job scheduler queue, and obtaining a current number of available streams for processing jobs in the job scheduler queue. The method includes calculating a distance between a first job in the job scheduler queue and the remaining jobs in the job scheduler queue using the one or more weightages to obtain a plurality of distances. The remaining jobs are reordered in the job scheduler queue based on the calculated distances. After the reordering, the first job is scheduled in the job scheduler queue and, after the scheduling of the first job, removing the first job from the job scheduler queue.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N, A to P, A to M, or A to L. As used herein, the aforementioned labeling means that the element may include any number of items and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In data protection applications, different tiers or policies may be configured for heterogeneous data objects such as virtual machines (VMs), applications, and file systems. Each tier may have dedicated data objects or combinations data objects to be backed up. For a backup schedule, a policy for priority may be triggered for each tier and the backups may be expected to be complete in a backup window. In environments with multiple policies running in the same schedule, the jobs may wait in a virtual queue for their turn to be allocated with system and media reservations/resources. Thus, in traditional scheduling approaches, there may be significant chance that a high priority job follows a low priority job. As a result, high priority jobs may not be completed or may be unduly delayed in favor of low priority jobs.

In general, embodiments of the invention relate to processing jobs associated with backup operations. More specifically, embodiments of the invention relate to obtaining properties of backup jobs associated with specific applications or virtual machines, where the applications or some or all of the virtual machines are to be backed up. The jobs are placed in an order within a priority queue for processing. In one or more embodiments, a job corresponds to individual set of actions/operations to be performed by e.g., the backup agents and the backup storage devices, etc.

In one or more embodiments of the invention, the application type and a policy determined by the administrator is used to determine a weightage of that job. This weightage is combined with the total wait time of the job in the queue as a multiplication constant in a calculation to evaluate a "distance" between jobs. In one or more embodiments of the invention, the calculated distance is used to sort the jobs in the queue.

In one or more embodiments of the invention, the specific order of the jobs within the priority queue at a given point in time may be based on the individual job weightage, individual job aging values, available streams for backup, and number of jobs in the queue. The ordering of the priority queue may be dynamically updated in response to jobs being processed, new jobs being added to the priority queue, and updates to the job aging values in accordance with one or more embodiments of the invention.

Figure 1:
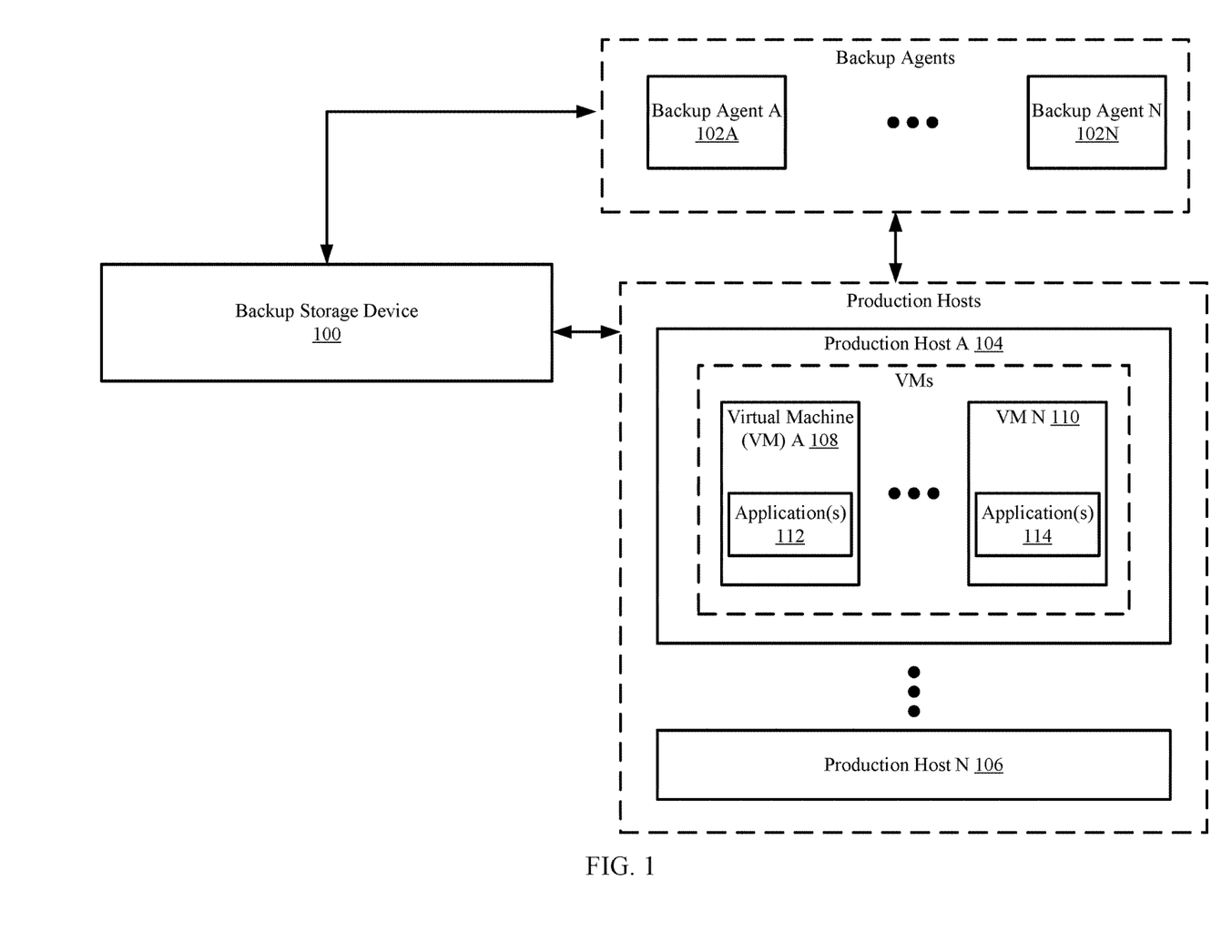
FIG. 1 shows a system in accordance with one or more embodiments of the invention.

FIG. 1 shows an example system in accordance with one or more embodiments of the invention. The system includes backup agents (102A, 102N), production hosts (104, 106), and a backup storage device (100). The system may include additional, fewer, and/or different components without departing from the invention. Each component may be operably connected via any combination of wired and/or wireless connections. Each component illustrated in FIG. 1 is discussed below.

In one or more embodiments of the invention, the backup agents (102A, 102N) perform backup operations of data and materials from the production hosts (104, 106). The backup agents (102A, 102N) may each perform a backup operation as assigned by the backup storage device. The backup operation may include obtaining data associated with a virtual machine (VM) or application and generating a copy of the data and storing it in a backup format in the backup storage device. The backup agents may perform backup operations in accordance with the jobs (also referred to as backup jobs) described herein. The backup agents may include functionality to obtain the backup properties (described below) for the backup jobs associated with a given production host and/or virtual machine. While the backup agents are shown as being external to the production hosts and backup storage device (100), the backup agents may reside on the production hosts, within the virtual machines on the production hosts, and/or within the backup storage device (100) without departing from the invention.

Figure 5:
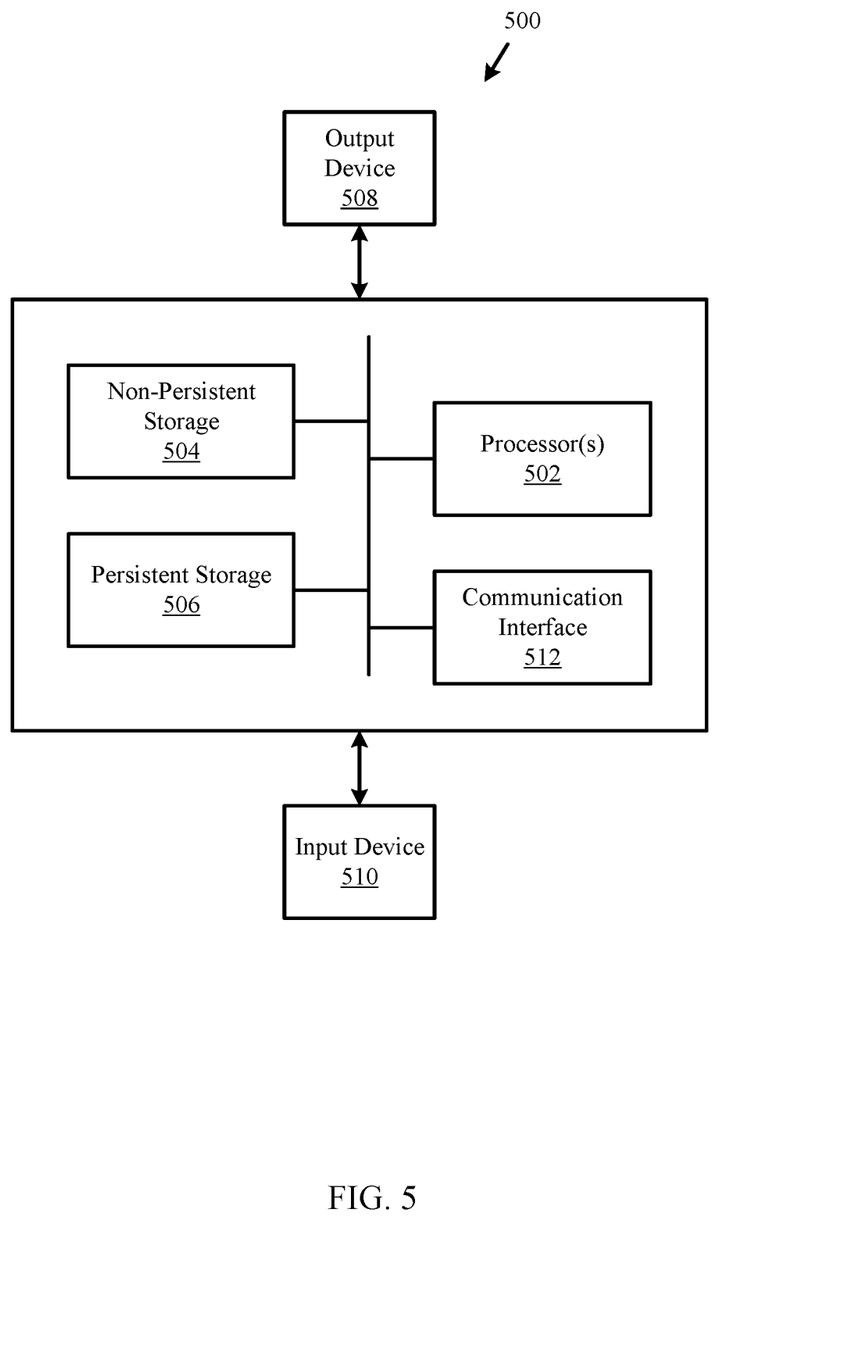
FIG. 5 shows a diagram of a computing device in accordance with one or more embodiments of the invention.

In one or more embodiments of the invention, the backup agents (102A, 102N) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent described throughout this application and/or all, or a portion thereof.

In one or more embodiments of the invention, the backup agents (102A, 102N) are implemented as a logical device. The logical device may utilize the computing resources of any number of computing devices and thereby provide the functionality of the backup agents.

In one or more embodiments of the invention, the production hosts (104, 106) may host virtual machines (VMs) (108, 110). The virtual machines (108, 110) may be logical entities executed using computing resources (not shown) of the production hosts. Each of the virtual machines (108, 110) may be performing similar or different processes. In one or more embodiments of the invention, the virtual machines (108, 110) provide services to users, e.g., clients (not shown). For example, the virtual machines (108, 110) may host instances of databases, email servers, and/or other applications (112, 114). The virtual machines may host other types of applications without departing from the invention. One of ordinary skill in the art will appreciate that embodiments disclosed herein are not limited to virtual machines.

In one or more of embodiments of the invention, the virtual machines (108, 110) are implemented as computer instructions, e.g., computer code, stored on a persistent storage (e.g., on a production host)) that when executed by a processor(s) of the production host cause the production host to provide the functionality of the virtual machines.

In one or more embodiments of the invention, the production host (104, 106) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host described throughout this application.

In one or more embodiments of the invention, the production host (104, 106) is implemented as a logical device. The logical device may utilize the computing resources of any number of computing devices and thereby provide the functionality of the production host described throughout this application.

In one or more embodiments of the invention, the backup storage device (100) may manage the backups of virtual machines (108, 110) hosted by the production hosts (104, 106). The backup storage device (100) may manage the backups by performing jobs in accordance with the ordering in the priority queue. Additional detail about the backup storage device is provided in FIG. 2.

Embodiments disclosed herein are not limited to the specific configuration of the system demonstrated in FIG. 1.

Figure 2:
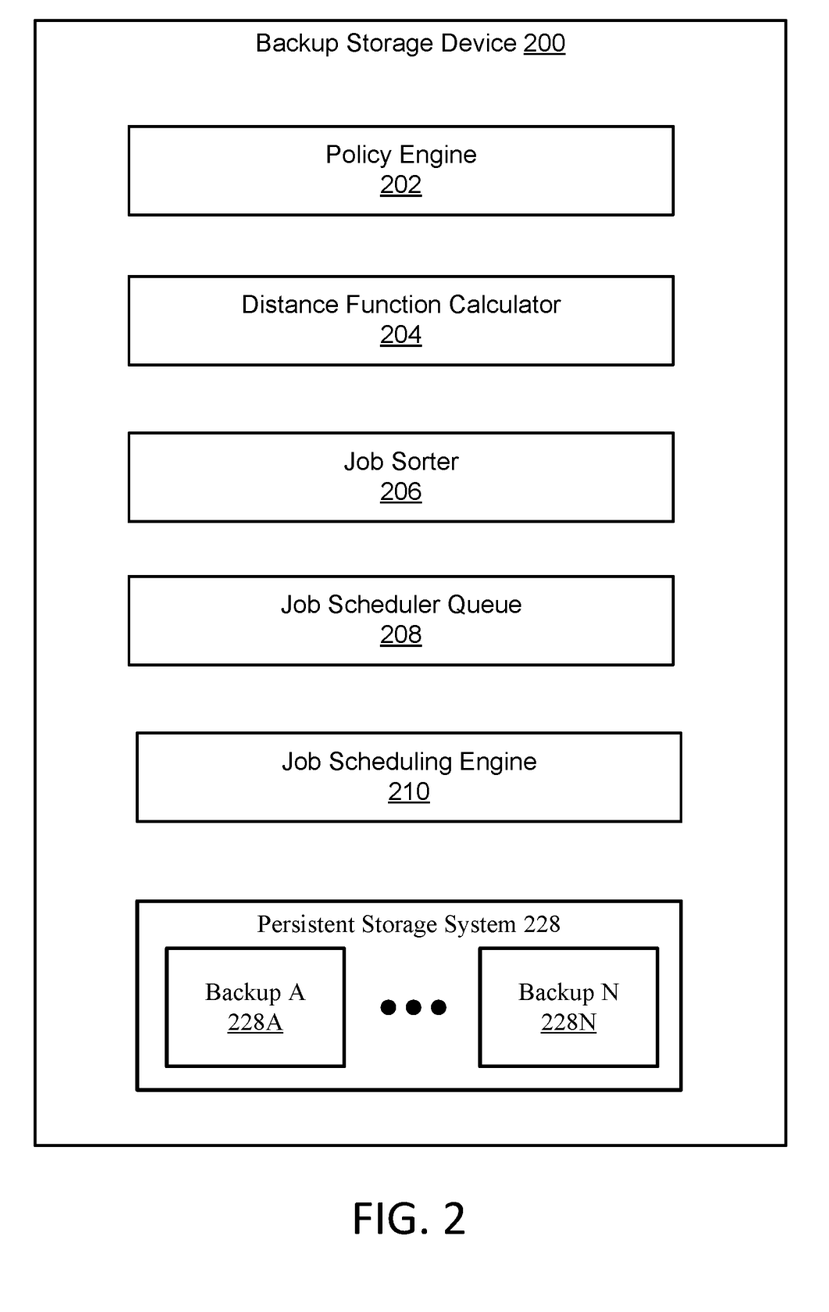
FIG. 2 describes the backup storage device in accordance with one or more embodiments disclosed herein.

FIG. 2 describes the backup storage device in accordance with one or more embodiments disclosed herein. The backup storage device (200) may include a policy engine (202), a distance function calculator (204), and a job sorter (206) that is configured to order the jobs in a job scheduler queue (208) for a job scheduler engine (210), and a persistent storage system (228).

The backup storage device (200) may include additional, fewer, and/or different components without departing from the invention. Each component of the backup storage device (200) is discussed below.

In one or more embodiments of the invention, the backup storage device (200) includes a policy engine (202) that obtains and stores policy level details and critical tags on jobs to be performed. The policy engine also communicates, or monitors, the status of jobs from the backup agents (102). In one or more embodiments, the policy engine (202) includes functionality to interact with the backup agents in order to perform all or a portion of the backup jobs. In one or more embodiments, the policy engine (202) may periodically receive updated values/information from the backup agents related to the one or more jobs.

In one or more embodiments of the invention, policy engine (202) is a hardware device including circuitry. The policy engine (202) may be, for example, a digital signal processor, a field programmable gate array, or an application specific integrated circuit. The policy engine (202) may be other types of hardware devices without departing from the invention.

In one or more embodiments of the invention, the policy engine (202) is implemented as computing code stored on a persistent storage that when executed by a processor of the backup storage device (100) performs the functionality of policy engine (202). The processor may be a hardware processor including circuitry such as, for example, a central processing unit or a microcontroller. The processor may be other types of hardware devices for processing digital information without departing from the invention.

The backup storage device (200) includes a distance function calculator (204) that calculates a distance between the jobs in the queue to determine the job order. Equation (1) below may be used to determine a distance between two jobs in accordance with one or more embodiments disclosed herein.

$$d = \sqrt{\frac{1}{N \cdot S}(W_j \cdot T_j - W_i \cdot T_i)^2} \quad (1)$$

In equation (1), the d is the distance between two jobs, N is the number of jobs in the job scheduler queue, S is the number of available streams, W is the weightage of a specific job, and T is a time factor that specifies the amount of time that the specific job has been in the job scheduler queue.

In one or more embodiments of the invention, the weightage (W) may be associated with a policy, or tier, of the backup process. The weightage may also be associated with a specific application in the backup jobs. The weightage may be a numeric value (e.g., a value between 0 and 100) or a qualitative value (e.g., critical, medium, low) that specifies the urgency at which a given job should be performed. In embodiments disclosed herein, qualitative values may be assigned numerical values for calculation of the distance. For example, critical, medium, and low may be assigned a value of 3, 2, and 1, respectively.

In one or more embodiments of the invention, the weightage is a combination of a policy weightage and an application weightage. For example, both the policy weightage and application weightage may each be categorized by critical, medium, and low (using a value of 3, 2, and 1, respectively).

In such embodiments, the weightage used to calculate the distance may be the product of the policy weightage and application weightage.

As described above, T is a time factor that indicates the job age. In one or more embodiments, a timestamp or counter value may be used to determine job aging values. The job aging values are used to track how long a given job is in job scheduler queue to ensure that the job is ultimately processed. In particular, in one embodiment of the invention, the longer the job remains in the queue the higher its job aging value, which ultimately results in the job being placed number the front of the job scheduler queue for processing.

In one or more embodiments, a distance between the jobs may be analyzed as metric for the performance of the backup system. For example, because the distance calculation includes the number of jobs in the job scheduler queue (N) and the available number of streams (S), the numerical value of the distance may be used as an indication of performance of the system. In one or more embodiments, the policy engine (202) may obtain the numerical values of the determined distances to gain insight into the system functionality.

In one or more embodiments, the one or both of the values of N and S may be set to 1, i.e., omitted from the consideration of the distance. In one or more embodiments, the distances may be calculated relative to a specific job. In such embodiments, the numerical values of $T_i$ and $W_i$ may be considered zero.

In one or more embodiments of the invention, the distance function calculator (204) is a hardware device including circuitry. The distance function calculator (204) may be, for example, a digital signal processor, a field programmable gate array, or an application specific integrated circuit. The distance function calculator (204) may be other types of hardware devices without departing from the invention.

In one or more embodiments of the invention, the distance function calculator (204) is implemented as computing code stored on a persistent storage that when executed by a processor of the backup storage device (100) performs the functionality of the distance function calculator (204). The processor may be a hardware processor including circuitry such as, for example, a central processing unit or a microcontroller. The processor may be other types of hardware devices for processing digital information without departing from the invention.

Returning to FIG. 2, the backup storage device (200) also includes a job sorter (206) in accordance with one or more embodiments of the invention. In one or more embodiments, the job sorter (206) sorts the jobs based on the distance and stores the sorted jobs in the job scheduler queue (208).

In one or more embodiments of the invention, the job sorter (206) and job scheduler queue (208) may be implemented using a hardware device including circuitry. The job sorter (206) and job scheduler queue (208) may be implemented, for example, as a digital signal processor, a field programmable gate array, or an application specific integrated circuit. The job sorter (206) and job scheduler queue (208) may be implemented using other types of hardware devices without departing from the invention.

In one or more embodiments of the invention, the job sorter (206) and job scheduler queue (208) may be implemented as computing code stored on a persistent storage that when executed by a processor of the backup storage device (100) performs the functionality of the job sorter (206) and job scheduler queue (208). The processor may be a hardware processor including circuitry such as, for example, a central processing unit or a microcontroller. The processor may be other types of hardware devices for processing digital information without departing from the invention.

In one or more embodiments, the job scheduling engine (210) processes the first job in the job scheduler queue. The job scheduling engine (210) may schedule the job on the available streams and remove the job from the job scheduler queue (208).

In one or more embodiments of the invention, the job scheduling engine (210) is a hardware device including circuitry. The job scheduling engine (210) may be, for example, a digital signal processor, a field programmable gate array, or an application specific integrated circuit. The job scheduling engine (210) may be other types of hardware devices without departing from the invention.

In one or more embodiments of the invention, job scheduling engine (210) is implemented as computing code stored on a persistent storage that when executed by a processor of the backup storage device (100) performs the functionality of the job scheduling engine (210). The processor may be a hardware processor including circuitry such as, for example, a central processing unit or a microcontroller. The processor may be other types of hardware devices for processing digital information without departing from the invention.

In one or more embodiments of the invention, the persistent storage system (228) is a system of persistent storage devices that store any number of backups (228A, 228N). In one or more embodiments of the invention, a backup (228A, 228N) is a copy of data associated with a virtual machine. The backup (228A, 228N) may include references to the data that may be used to access the data from the persistent storage system (228). A backup may further include additional data that enables the backup storage device (200) to restore a virtual machine (or a portion of data associated with the virtual machine) associated with the backup from any production host (104, 106).

In one or more embodiments of the invention, each backup (228A, 228N) is associated with all data and/or applications of a virtual machine (108, 110) at a specific point in time. For example, a first backup may include all data and/or applications of a first virtual machine at a point in time T1. A second backup may include all data and/or applications of the first virtual machine at a point in time T2.

In one or more embodiments of the invention, each of the persistent storage system (228) includes magnetic memory devices, optical memory devices, solid state memory devices, phase change memory devices, any other suitable type of persistent memory device, or any combination thereof.

In one or more embodiments of the invention, the backup storage device (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device described throughout this application.

Figure 3:
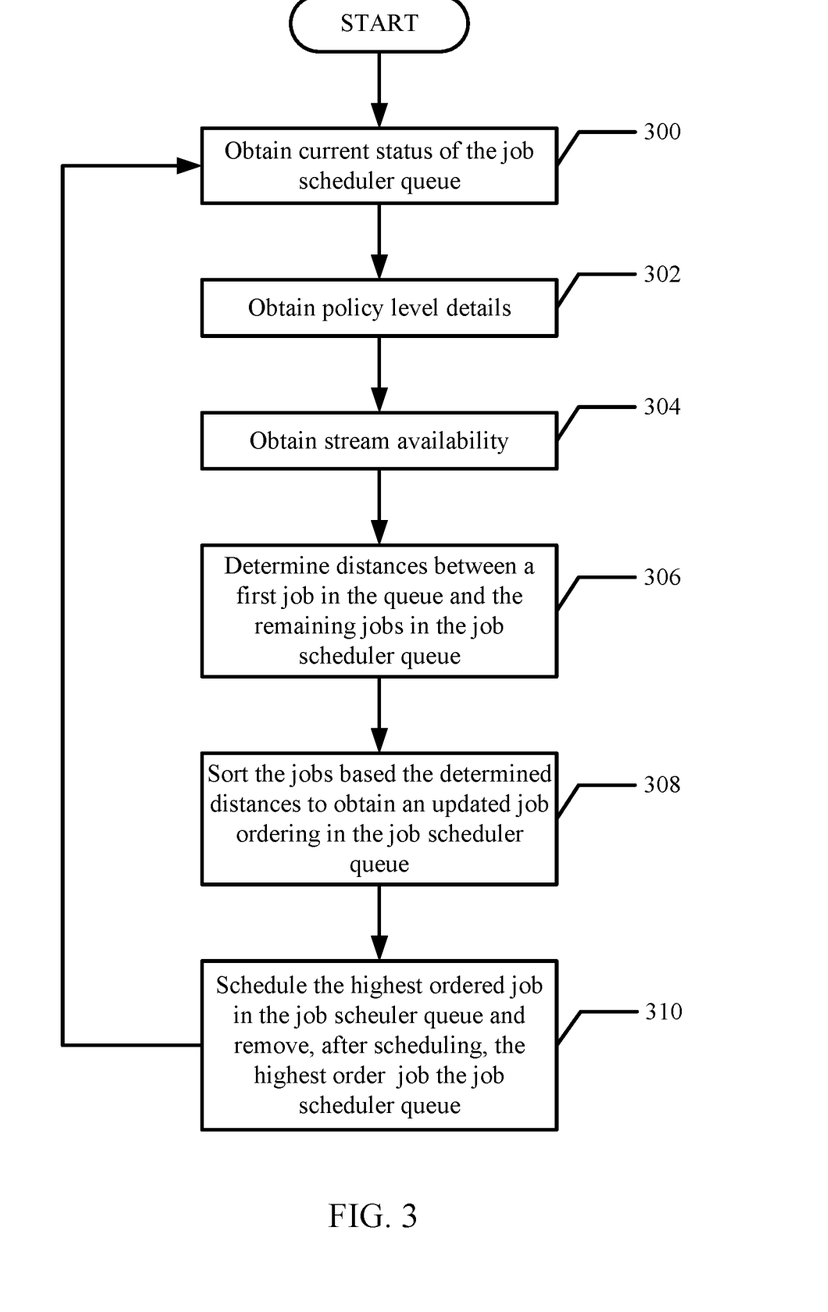
FIG. 3 shows a flowchart for sorting jobs in accordance with one or more embodiments of the invention.

FIG. 3 shows a flowchart for ordering jobs in accordance with one or more embodiments of the invention. The method shown in FIG. 3 may be performed, for example, by a backup storage device (or one or more components thereon).

Other components of the system illustrated in FIG. 1 may perform the method of FIG. 3 without departing from the invention.

In step 300, the current status of the job scheduler queue is obtained. In one or more embodiments of the invention, the current status of the job scheduler queue may be obtained by the distance function calculator (204) from the job scheduler queue (208). The current job status may include the number of jobs currently in the job scheduler queue, the current order of these jobs, and how long each job has been in the queue (i.e., the time factor of the job).

In step 302, the policy level details are obtained. In one or more embodiments of the invention, the policy level details may be obtained from the policy engine (202). The policy level details include, but are not limited to, the weightages of the job, including the policy weightage and/or the application weightage.

In step 304, the current stream availability for the jobs is obtained. In one or more embodiments, the stream availability is obtained from the job scheduler engine (202). The stream availability specifies the number of streams that are currently available to use to process backup jobs. In step 306, the distance between the first job in the queue and the remaining jobs in the job scheduler queue is determined. In one or more embodiments, the distance is determined by the distance function calculator (204) using the obtain information in steps 300-304 from the policy engine (202), job scheduler queue (208), and job scheduling engine (210).

In step 308, the jobs are sorted based on the determined distances to obtain an updated job ordering in the job scheduler queue. In one or more embodiments, the jobs are sorted by the job sorter (206) and the updated job ordering is stored in the job scheduler queue (208). In one or more embodiments, the jobs are ordered in descending order of distance.

In step 310, the highest ordered job in the job scheduler queue is scheduled and, after scheduling, the highest ordered job is removed from the job scheduler queue. In one or more embodiments, the job scheduling engine (210) schedules the job and removes the scheduled jobs from the job scheduling queue.

After the highest ordered job has been removed from the job scheduling queue, the process returns to step 300, and repeats the process. The process may be continuous, as long as jobs exist in the job scheduling queue in accordance with one or more embodiments of the invention.

In one or more embodiments, jobs may be added to the job scheduling queue at any time. In some embodiments, the jobs may be added to the end of the job scheduling queue after a job is removed from the queue or when the job scheduler queue is obtained as demonstrated by step 300 of FIG. 3.

EXAMPLE

Figure 4:
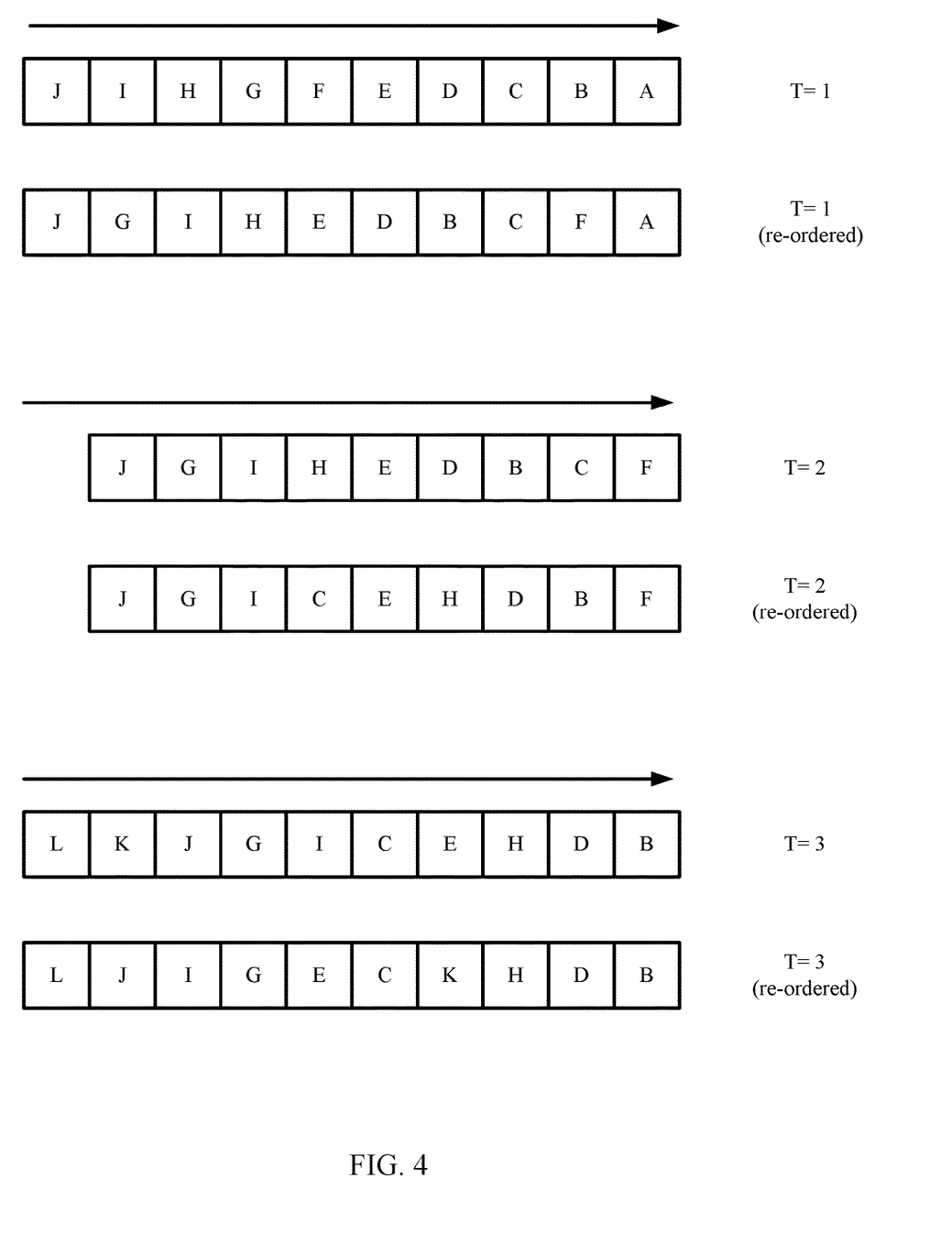
FIG. 4. shows an example in accordance with one or more embodiments of the invention.

FIG. 4. shows an example of ordering jobs in a queue in accordance with one or more embodiments of the invention. The example is not intended to limit the scope of the invention. In the example of FIG. 4, given an alphabetical representation of the jobs in scheduler queue, at T=1, the jobs are reordered according to the distance between job A and the remaining jobs in the queue, jobs B to J. In this example, the greatest distance is determined to be between job A and job F, the next greatest distance is the distance between job A and job C, and so on as shown in the reordered queue at T=1. Job A is subsequently scheduled for processing and removed from the job scheduling queue. At T=2, Job F is at the "front" of the job scheduling queue. Accordingly, the distances between job F and the remaining jobs in the queue are determined and the queue is reordered at shown in FIG. 4.

In the example of FIG. 4, even though no new jobs have been added to the queue, the jobs are shown reordered. Job F is subsequently scheduled for processing and removed from the job scheduling queue. As described above, the distance calculation may be a function of weightage-both policy weightage and application weightage, number of streams, number of jobs in the queue, and time that the job has been in the queue. In other examples, the ordering of the queue may not change if no jobs are added.

As some time after T=2 and prior to T=3 jobs L and K are added to the job scheduling queue. As shown in FIG. 4, the jobs are also reordered at T=3 in accordance with FIG. 3. Specifically, Job B is at the "front" of the job scheduling queue. Accordingly, the distances between job B and the remaining jobs in the queue, including the newly added jobs L and K, the jobs are determined and then the jobs as are reordered as shown. In this example, job K is moved primarily based on the weightage of the job, available streams, and number of jobs, given that the job was recently added to the queue.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the backup storage device. Further, such instructions may correspond to computer readable instructions that are stored on one or more non-transitory computer readable mediums.

One or more embodiments of the invention may improve the operation of one or more computing systems. More specifically, one or more embodiments of the invention may provide dynamic sorting of jobs in a scheduler using a queue. One or more embodiments of the invention may dynamically balance job traffic for efficient delivery of backup services.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing jobs, the method comprising:
obtaining a current status of a job scheduler queue;
obtaining policy-level information comprising one or more weightages for each job in the job scheduler queue;
obtaining a current number of available streams for processing jobs in the job scheduler queue;
calculating a distance between a first job in the job scheduler queue and the remaining jobs in the job scheduler queue using the one or more weightages to obtain a plurality of distances;
reordering the remaining jobs in the job scheduler queue based on the calculated distances;
scheduling, after the reordering, the first job in the job scheduler queue; and
after scheduling the first job, removing the first job from the job scheduler queue.

2. The method of claim 1, wherein the weightage comprises a policy weightage and an application weightage.

3. The method of claim 1, wherein the calculated distances is further based on the current number of available streams and a number of jobs in the job scheduler queue.

4. The method of claim 1, wherein the remaining jobs in the job scheduler queue are arranged in decreasing order of the calculated distances.

5. The method of claim 1, wherein the jobs in the job scheduler queue are a part of a backup process.

6. The method of claim 1, wherein the current status of the job scheduler queue comprises a time factor for each job in the job scheduler queue.

7. The method of claim 6, wherein a calculated distance of the calculated distances is calculated using the following equation:

$$d = \sqrt{\frac{1}{N \cdot S}(W_j \cdot T_j - W_i \cdot T_i)^2}$$

where d is the distance between two jobs, N is a number of jobs in the job scheduler queue, S is the number of available streams, W is the weightage of each job, and T is the time factor for the corresponding job.

8. A non-transitory computer: readable medium comprising computer-readable program code, which when executed by a computer processor enables the computer processor to perform a method for performing jobs, the method comprising:
  obtaining a current status of a job scheduler queue;
  obtaining policy-level information comprising one or more weightages for each job in the job scheduler queue;
  obtaining a current number of available streams for processing jobs in the job scheduler queue;
  calculating a distance between a first job in the job scheduler queue and the remaining jobs in the job scheduler queue using the one or more weightages to obtain a plurality of distances;
  reordering the remaining jobs in the job scheduler queue based on the calculated distances;
  scheduling, after the reordering, the first job in the job scheduler queue; and
  after scheduling the first job, removing the first job from the job scheduler queue.

9. The non-transitory computer-readable medium of claim 8, wherein the weightage comprises a policy weightage and an application weightage.

10. The non-transitory computer-readable medium of claim 8, wherein the calculated distances is further based on the current number of available streams and a number of jobs in the job scheduler queue.

11. The non-transitory computer-readable medium of claim 8, wherein the remaining jobs in the job scheduler queue are arranged in decreasing order of the calculated distances.

12. The non-transitory computer-readable medium of claim 8, wherein the jobs in the job scheduler queue are a part of a backup process.

13. The non-transitory computer-readable medium of claim 8, wherein the current status of the job scheduler queue comprises a time factor for each job in the job scheduler queue.

14. The non-transitory computer: readable medium of claim 13, wherein a calculated distance of the calculated distances is calculated using the following equation:

$$d = \sqrt{\frac{1}{N \cdot S}(W_j \cdot T_j - W_i \cdot T_i)^2}$$

where d is the distance between two jobs, N is a number of jobs in the job scheduler queue, S is the number of available streams, W is the weightage of each job, and T is the time factor for the corresponding job.

15. A system, comprising:
a backup storage device comprising a processors with memory configured to:
  obtaining a current status of a job scheduler queue;
  obtaining policy-level information comprising one or more weightages for each job in the job scheduler queue;
  obtaining a current number of available streams for processing jobs in the job scheduler queue;
  calculating a distance between a first job in the job scheduler queue and the remaining jobs in the job scheduler queue using the one or more weightages to obtain a plurality of distances;
  reordering the remaining jobs in the job scheduler queue based on the calculated distances;
  scheduling, after the reordering, the first job in the job scheduler queue; and
  after scheduling the first job, removing the first job from the job scheduler queue.

16. The system of claim 15, wherein the weightage comprises a policy weightage and an application weightage.

17. The system of claim 15, wherein the calculated distances is further based on the current number of available streams and a number of jobs in the job scheduler queue.

18. The system of claim 15, wherein the remaining jobs in the job scheduler queue are arranged in decreasing order of the calculated distances.

19. The system of claim 15, wherein the jobs in the job scheduler queue are a part of a backup process.

20. The system of claim 15, wherein a calculated distance of the calculated distances is calculated using the following equation:

$$d = \sqrt{\frac{1}{N \cdot S}(W_j \cdot T_j - W_i \cdot T_i)^2}$$

where d is the distance between two jobs, N is a number of jobs in the job scheduler queue, S is the number of available streams, W is the weightage of each job, and T is a time factor for the corresponding job.

* * * * *